United States Patent
Heo et al.

(10) Patent No.: US 10,758,893 B2
(45) Date of Patent: Sep. 1, 2020

(54) SOLID-PHASE CATALYST FOR DECOMPOSING HYDROGEN PEROXIDE AND METHOD FOR PRODUCING SAME

(71) Applicants: KOREA RESEARCH INSTITUTE OF CHEMICAL TECHNOLOGY, Daejeon (KR); NF CO., LTD, Busan (KR)

(72) Inventors: Iljeong Heo, Jeju-do (KR); Jeong Kwon Suh, Daejeon (KR); Beom Sik Kim, Daejeon (KR); Tae Sun Chang, Daejeon (KR); Yun Ho Jeong, Daejeon (KR); Ji Hoon Park, Gyeonggi-do (KR); Soo Min Kim, Seoul (KR); Ji Na Choi, Daejeon (KR)

(73) Assignees: Korea Research Insitute of Chemical Technology (KR); NF CO., Ltd. (KR)

( * ) Notice: Subject to any disclaimer, the term of this patent is extended or adjusted under 35 U.S.C. 154(b) by 0 days.

(21) Appl. No.: 16/069,619

(22) PCT Filed: Jan. 13, 2017

(86) PCT No.: PCT/KR2017/000452
§ 371 (c)(1),
(2) Date: Jul. 12, 2018

(87) PCT Pub. No.: WO2017/123036
PCT Pub. Date: Jul. 20, 2017

(65) Prior Publication Data
US 2019/0009253 A1  Jan. 10, 2019

(30) Foreign Application Priority Data

Jan. 14, 2016 (KR) .......................... 10-2016-0004640

(51) Int. Cl.
*B01J 23/34* (2006.01)
*C01G 45/12* (2006.01)
(Continued)

(52) U.S. Cl.
CPC ............. *B01J 23/34* (2013.01); *B01J 23/688* (2013.01); *B01J 35/0013* (2013.01);
(Continued)

(58) Field of Classification Search
None
See application file for complete search history.

(56) References Cited

U.S. PATENT DOCUMENTS

2005/0042757 A1    2/2005 Famme

FOREIGN PATENT DOCUMENTS

EP    0309594    4/1989
JP    H07-069640    3/1995
(Continued)

OTHER PUBLICATIONS

International Search Report prepared by the Korean Intellectual Property Office dated Apr. 14, 2017, for International Application No. PCT/KR2017/000452.
(Continued)

*Primary Examiner* — Melissa S Swain
(74) *Attorney, Agent, or Firm* — Sheridan Ross P.C.

(57) ABSTRACT

The present invention provides a solid-phase catalyst for decomposing hydrogen peroxide comprising a permanganate salt and a manganese (II) salt. The solid-phase catalyst stays a solid state in the form of nanoparticles at the time of hydrogen peroxide decomposition, and thus can be recovered for reuse and also has an excellent decomposition rate. In the method for producing a solid-phase catalyst for decomposing hydrogen peroxide according to the present invention, a solid-phase catalyst is produced from a solution
(Continued)

containing a permanganate salt, a manganese (II) salt, and an organic acid, so that the produced solid-phase catalyst is precipitated as a solid component even after a catalytic reaction, and thus is reusable and environmentally friendly, and cost reduction can be achieved through the simplification of a catalyst production technique.

6 Claims, 1 Drawing Sheet

(51) Int. Cl.

| | |
|---|---|
| *C01B 15/01* | (2006.01) |
| *C01G 45/02* | (2006.01) |
| *B01J 23/68* | (2006.01) |
| *B01J 35/00* | (2006.01) |
| *B01J 35/02* | (2006.01) |
| *B01J 37/02* | (2006.01) |
| *B01J 37/03* | (2006.01) |
| *B01J 37/04* | (2006.01) |
| *B01J 37/06* | (2006.01) |
| *B01J 37/08* | (2006.01) |
| *C01B 5/00* | (2006.01) |
| *C01B 13/02* | (2006.01) |

(52) U.S. Cl.
CPC ......... *B01J 35/026* (2013.01); *B01J 37/0236* (2013.01); *B01J 37/031* (2013.01); *B01J 37/04* (2013.01); *B01J 37/06* (2013.01); *B01J 37/088* (2013.01); *C01B 5/00* (2013.01); *C01B 13/0203* (2013.01); *C01B 15/01* (2013.01); *C01G 45/02* (2013.01); *C01G 45/1214* (2013.01)

(56) References Cited

FOREIGN PATENT DOCUMENTS

| | | |
|---|---|---|
| JP | 2002-059003 | 2/2002 |
| KR | 10-2010-0135246 | 12/2010 |
| KR | 10-2012-0114383 | 10/2012 |
| WO | WO 2009/006586 | 1/2009 |

OTHER PUBLICATIONS

Bai et al. "Relationship between Nanostructure and Electrochemical/Biosensing Properties of MnO2 Nanomaterials for H2O2/Choline," J. Phys. Chem. C, 2008, vol. 112, pp. 18984-18990.

Jang et al. "Production of Dry Oxidant through Catalytic H2O2 Decomposition over Mn-based Catalysts for NO Oxidation," Clean Technology, Jun. 2015, vol. 21, No. 2, pp. 130-139.

SOLID-PHASE CATALYST FOR DECOMPOSING HYDROGEN PEROXIDE AND METHOD FOR PRODUCING SAME

CROSS REFERENCE TO RELATED APPLICATIONS

This application is a national stage application under 35 U.S.C. 371 and claims the benefit of PCT Application No. PCT/KR2017/000452 having an international filing date of 13 Jan. 2017, which designated the United States, which PCT application claimed the benefit of the Republic of Korea Patent Application No. 10-2016-0004640 filed 14 Jan. 2016, the disclosure of each of which are incorporated herein by reference.

BACKGROUND OF THE INVENTION

1. Field of the Invention

The present invention relates to a solid-phase catalyst for decomposing hydrogen peroxide and a method for producing the same. Particularly, the present invention relates to a solid-phase catalyst for decomposing hydrogen peroxide which is reusable, treated with an organic acid and present in a heterogeneously crystallized solid phase in hydrogen peroxide, and a method for producing the same.

2. Description of the Related Art

Hydrogen peroxide is a compound comprising hydrogen and oxygen, which has a strong oxidizing power, so that it is used as an oxidizing agent, a bleaching agent, a disinfectant and an oxygen source. Hydrogen peroxide is usually used in the form of an aqueous solution because of a stability reason. The commercially available hydrogen peroxide has a concentration of 30% to 35%. When hydrogen peroxide is used for a specific purpose such as a rocket propellant, hydrogen peroxide with a concentration of at least 90% is used. However in that case, extra caution is needed since it is highly explosive. Low concentration hydrogen peroxide stays stably in an aqueous solution but is decomposed by a catalyst as shown in reaction formula 1 to generate oxygen and water with releasing heat.

$2H_2O_2 \rightarrow 2H_2O+O_2$, $\Delta H=-98.2$ kJ/mol  <Reaction Formula 1>

There are various types of catalysts decomposing hydrogen peroxide. Transition metals such as manganese (Mn), silver (Ag), platinum (Pt), and iron (Fe); alkali metals and their compounds; enzymes; organic substances; potassium iodide (KI); potassium permanganate ($KMnO_4$); sodium hypochlorite (NaOCl) can induce the decomposition of hydrogen peroxide. The most representative catalyst to decompose hydrogen peroxide is a manganese-based catalyst, which is exemplified by manganese dioxide ($MnO_2$). By using such a catalyst, hydrogen peroxide can be decomposed to obtain oxygen at a high concentration, so that it can be utilized as an oxygen source for a liquid fuel and oxygen generator. In addition, the radicals such as HO• and HOO• generated during the decomposition of hydrogen peroxide are utilized in the process for oxidizing and removing contaminants present in an aqueous solution.

In the case of oxygen generation or pollutant removal through the hydrogen peroxide decomposition, the amount of oxygen generated and the pollutant reduction performance depend on the hydrogen peroxide content and the performance of the catalyst. Since the manganese-based catalyst, potassium permanganate ($KMnO_4$), exists in a homogeneous form in an aqueous solution, it can induce a rapid decomposition reaction even in a low temperature region. However, after completion of the reaction, the catalyst component is uniformly dispersed in the aqueous solution, which is not easy to recover and may cause additional environmental problems. In the meantime, a solid-phase catalyst is generally precipitated in the aqueous solution after completion of the hydrogen peroxide decomposition with displaying layer separation, so that it can be recovered easily and can be reused. However, since the catalyst exists in a heterogeneous state in hydrogen peroxide, the decomposition reaction rate is slow (Korean Patent No. 10-2013-0030314).

The present inventors have developed a solid-phase catalyst that can induce fast decomposition of hydrogen peroxide at a low temperature and can be reused after being precipitated in a form that can be recovered easily after completion of the reaction and also have developed a method for the precipitation of a catalyst as a solid component after the reaction by treating a permanganate salt and a manganese (II) salt chemically thereto, leading to the completion of the present invention.

SUMMARY OF THE INVENTION

It is an object of the present invention to provide a solid-phase catalyst having improved hydrogen peroxide decomposition ability and a method for producing the same.

To achieve the above object, the present invention provides a solid-phase catalyst for decomposing hydrogen peroxide comprising a permanganate salt and a manganese (II) salt.

The present invention also provides a method for producing a solid-phase catalyst for decomposing hydrogen peroxide comprising the following steps:

preparing an aqueous solution containing a permanganate salt, a manganese (II) salt and an organic acid (step 1);

aging the aqueous solution of step 1 to form a solid-phase catalyst (step 2); and cleaning, drying and calcinating the solid-phase catalyst formed in step 2 (step 3).

Further, the present invention provides an apparatus for the decomposition of hydrogen peroxide comprising the solid-phase catalyst for decomposing hydrogen peroxide.

In addition, the present invention provides a method for the decomposition of hydrogen peroxide comprising the following steps:

immersing the solid-phase catalyst of claim 1 in hydrogen peroxide to induce the decomposition of hydrogen peroxide into water and oxygen (step a); and recovering the solid-phase catalyst remaining after the catalytic reaction in step a (step b).

ADVANTAGEOUS EFFECT

The solid-phase catalyst of the present invention stays a solid state in the form of nanoparticles at the time of hydrogen peroxide decomposition, and thus can be recovered for reuse and also has an excellent decomposition rate. In the method for producing a solid-phase catalyst for decomposing hydrogen peroxide according to the present invention, a solid-phase catalyst is produced from a solution containing a permanganate salt, a manganese (II) salt, and an organic acid, so that the produced solid-phase catalyst is precipitated as a solid component even after a catalytic reaction, and thus is reusable and environmentally friendly, and cost reduction can be achieved through the simplification of a catalyst production technique.

BRIEF DESCRIPTION OF THE DRAWINGS

The application of the preferred embodiments of the present invention is best understood with reference to the accompanying drawings, wherein.

BEST MODE

Figure 1:
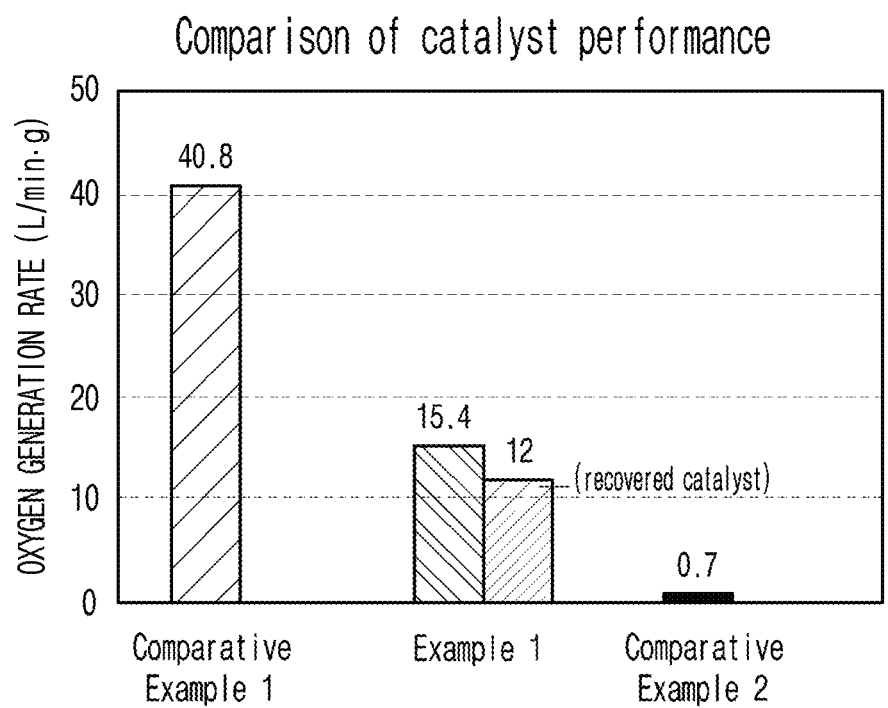
FIG. 1 is a graph illustrating the oxygen generation rate during the decomposition of hydrogen peroxide by the catalysts of Example 1, Comparative Example 1 and Comparative Example 2 according to the present invention.

Hereinafter, the present invention will be described in detail with reference to the following examples and experimental examples.

However, the following examples and experimental examples are merely illustrative of the present invention, and the scope of the present invention is not limited by examples and experimental examples.

EXAMPLE 1

Preparation of a Solid-phase Catalyst for Decomposing Hydrogen Peroxide Treated with Acetic Acid Step 1: 10 ml of 1 M potassium permanganate and 30 ml of 1 M manganese (II) acetate were dissolved in 20 ml of distilled water, to which 99% acetic acid was additionally added. Then the mixture was stirred at room temperature for 10 minutes.

Step 2: The mixture prepared in step 1 was tightly sealed, followed by aging in a dark room at room temperature under normal pressure for 72 hours.

Step 3: The solid-phase catalyst produced in the mixture of step 2 was recovered, which was then washed with ml of ethanol and then dried in a 70° C. vacuum oven. Then, calcination was performed at 200° C., resulting in the preparation of a solid-phase catalyst for decomposing hydrogen peroxide.

EXAMPLE 2

Preparation of a Solid-Phase Catalyst for Decomposing Hydrogen Peroxide Treated with Formic Acid A solid-phase catalyst for decomposing hydrogen peroxide was prepared by the same manner as described in Example 1, except that 15 ml of 96% formic acid was used instead of acetic acid as an organic acid in step 1 of Example 1.

EXAMPLE 3

Preparation of a Solid-Phase Catalyst for Decomposing Hydrogen Peroxide Treated with Oxalic Acid A solid-phase catalyst for decomposing hydrogen peroxide was prepared by the same manner as described in Example 1, except that 8 ml of 3 M oxalic acid was used instead of acetic acid as an organic acid in step 1 of Example 1.

EXAMPLE 4

Preparation of a Solid-Phase Catalyst for Decomposing Hydrogen Peroxide Treated with Citric Acid A solid-phase catalyst for decomposing hydrogen peroxide was prepared by the same manner as described in Example 1, except that 8 ml of 12 M citric acid was used instead of acetic acid as an organic acid in step 1 of Example 1.

COMPARATIVE EXAMPLE 1

Homogeneous Catalyst

Potassium permanganate ($KMnO_4$) manufactured by Junsei Co. (CAS No.: 7722-64-7, Lot No.: 2015C1513, Assay: min. 99.3%) was prepared.

COMPARATIVE EXAMPLE 2

Homogeneous Catalyst

Manganese dioxide ($MnO_2$) manufactured by Sigma-Aldrich Co. (CAS No.: 1313-13-9, 025-001-00-3 Lot No.: MKBS8414V, Assay: min. 99.99% (trace metal basis)) was prepared.

COMPARATIVE EXAMPLE 3

Preparation of a Solid-Phase Catalyst for Decomposing Hydrogen Peroxide Treated with Propionic Acid A solid-phase catalyst for decomposing hydrogen peroxide was prepared by the same manner as described in Example 1, except that 30 ml of 99% propionic acid was used instead of acetic acid as an organic acid in step 1 of Example 1.

COMPARATIVE EXAMPLE 4

Preparation of a Solid-Phase Catalyst for Decomposing Hydrogen Peroxide Treated with Butyric Acid A solid-phase catalyst for decomposing hydrogen peroxide was prepared by the same manner as described in Example 1, except that 40 ml of 99% butyric acid was used instead of acetic acid as an organic acid in step 1 of Example 1.

DESCRIPTION OF THE PREFERRED EMBODIMENTS

Hereinafter, the preferable embodiments of the present invention are described with the attached drawings. However, the embodiments of the present invention can be modified and altered in various ways and the present invention is not limited to the following illustration. It is well understood by those in the art who has the average knowledge on this field that the embodiments of the present invention are given to explain the present invention more precisely. Therefore, the shape and size of the elements in the drawings may be exaggerated for clarity of illustration and the elements indicated by the same mark in the drawings are the same elements. The factors showing similar function or activity are also indicated by the same mark in all the drawings. In addition, the inclusion of an element throughout the specification does not exclude other elements, but may include other elements, unless specifically stated otherwise.

The present invention provides a solid-phase catalyst for decomposing hydrogen peroxide comprising a permanganate salt and a manganese (II) salt.

Hereinafter, the solid-phase catalyst for decomposing hydrogen peroxide comprising a permanganate salt and a manganese (II) salt according to the present invention is described in more detail.

Since the manganese-based catalyst, potassium permanganate ($KMnO_4$), exists in a homogeneous form in an aqueous solution, it can induce a rapid decomposition reaction even in a low temperature region. However, after completion of the reaction, the catalyst component is uniformly dispersed in the aqueous solution, which is not easy to recover and may cause additional environmental problems. In the meantime, a solid-phase catalyst is generally precipitated in the aqueous solution after completion of the hydrogen peroxide decomposition with displaying layer separation, so that it can be recovered easily and can be reused. However, since the catalyst exists in a heterogeneous state in hydrogen peroxide, the decomposition reaction rate is slow.

The solid-phase catalyst for decomposing hydrogen peroxide of the present invention has been improved to overcome the disadvantage of the homogeneous catalyst and the heterogeneous catalyst above. The solid-phase catalyst for decomposing hydrogen peroxide is produced by treating an organic acid, so that it can stay in the form of nanoparticles in hydrogen peroxide heterogeneously, indicating that the decomposition rate of hydrogen peroxide is accelerated and the recovery of the used catalyst is easy after completion of the decomposition reaction.

The nanoparticle form can exist in the form of an aggregate of nanoparticles in which a permanganate salt and a manganese (II) salt are converted into manganese oxides.

In the solid-phase catalyst for decomposing hydrogen peroxide comprising a permanganate salt and a manganese (II) salt according to the present invention, the permanganate salt is exemplified by potassium permanganate ($KMnO_4$), zinc permanganate ($Zn(MnO_4)_2$), calcium permanganate ($CaMnO_4$), silver permanganate ($AgMnO_4$), sodium permanganate ($NaMnO_4$), barium permanganate ($Br(MnO_4)_2$), magnesium permanganate ($Mg(MnO_4)_2$), strontium permanganate ($Sr(MnO_4)_2$), lithium permanganate ($LiMnO_4$), cadmium permanganate ($Cd(MnO_4)_2$), cesium permanganate ($CsMnO_4$), and rubidium permanganate ($RbMnO_4$), and is preferably potassium permanganate ($KMnO_4$), but not always limited thereto.

The manganese (II) salt herein is exemplified by manganese acetate, manganese nitrate, manganese chloride, manganese acetylacetonate, manganese bromide, manganese carbonate, manganese fluoride, manganese iodide and manganese sulfate, and is preferably manganese acetate, but not always limited thereto.

In the course of the hydrogen peroxide decomposition using the solid-phase catalyst for decomposing hydrogen peroxide above, an exothermic reaction occurs in which water and oxygen gas are generated. The oxygen generation rate at this time is 8 L/min·g~22 L/min·g, preferably 9 L/min·g~21 L/min·g, and more preferably 10 L/min·g~20 L/min·g.

The present invention also provides a method for producing a solid-phase catalyst for decomposing hydrogen peroxide comprising the following steps:

preparing an aqueous solution containing a permanganate salt, a manganese (II) salt and an organic acid (step 1);

aging the aqueous solution of step 1 to form a solid-phase catalyst (step 2); and cleaning, drying and calcinating the solid-phase catalyst formed in step 2 (step 3).

Hereinafter, the method for producing a solid-phase catalyst for decomposing hydrogen peroxide of the present invention is described in more detail step by step.

First, in the method for producing a solid-phase catalyst for decomposing hydrogen peroxide of the present invention, step 1 is to prepare an aqueous solution comprising a permanganate salt, a manganese (II) salt and an organic acid.

Step 1 is a pre-stage to form a solid-phase catalyst. In step 1, the permanganate and manganese (II) salts contained in the solid-phase catalyst are immersed in distilled water and mixed with the organic acid.

The permanganate salt of step 1 is exemplified by potassium permanganate ($KMnO_4$), zinc permanganate ($Zn(MnO_4)_2$), calcium permanganate ($CaMnO_4$), silver permanganate ($AgMnO_4$), sodium permanganate ($NaMnO_4$), barium permanganate ($Br(MnO_4)_2$), magnesium permanganate ($Mg(MnO_4)_2$), strontium permanganate ($Sr(MnO_4)_2$), lithium permanganate ($LiMnO_4$), cadmium permanganate ($Cd(MnO_4)_2$), cesium permanganate ($CsMnO_4$), and rubidium permanganate ($RbMnO_4$), and is preferably potassium permanganate ($KMnO_4$), but not always limited thereto.

The manganese (II) salt of step 1 is exemplified by manganese acetate, manganese nitrate, manganese chloride, manganese acetylacetonate, manganese bromide, manganese carbonate, manganese fluoride, manganese iodide and manganese sulfate, and is preferably manganese acetate, but not always limited thereto.

The organic acid of step 1 is selected from the group consisting of formic acid, acetic acid, oxalic acid and citric acid, but not always limited thereto.

In the course of preparing the mixture of step 1, potassium permanganate ($KMnO_4$) and manganese acetate can be used as the permanganate salt and the manganese (II) salt, and at this time the mixing weight ratio of potassium permanganate and manganese acetate is 1:1~1:5, preferably 1:2~1:4, and more preferably 1:2.8~1:3.6, but not always limited thereto.

In addition, in the course of preparing the aqueous solution of step 1, the concentration of the organic acid is 50.0%~99.9%, preferably 75.0%~99.9%, and more preferably 90.0%~99.9%, but not always limited thereto and any concentration range can be accepted as long as the condition facilitates the preparation of a catalyst that can stay as a solid state in hydrogen peroxide in the presence of the permanganate salt and the manganese (II) salt.

Next, in the method for producing a solid-phase catalyst according to the present invention, step 2 is to form a solid-phase catalyst by aging the aqueous solution of step 1.

In step 2, in order to form a catalyst staying in the form of a solid component during the catalytic reaction in hydrogen peroxide, the aqueous solution prepared in step 1 is aged.

The aging treatment of step 2 is performed with the aqueous solution in a dark room at room temperature at normal pressure for 5~80 hours, preferably for 35~75 hours, and more preferably for 65~75 hours, but not always limited thereto.

Next, in the method for producing a solid-phase catalyst according to the present invention, step 3 is to wash the solid-phase catalyst formed in step 2, followed by drying and calcinating thereof.

In step 3, in order to produce the final solid-phase catalyst for decomposing hydrogen peroxide, the solid-phase catalyst formed in step 2 is recovered, washed, dried, and calcinated.

The washing process in step 3 can be performed with distilled water, alcohol and acetone, but not always limited thereto.

The drying process in step 3 can be performed at the temperature range between 50° C. and 110° C. at normal pressure or below.

The calcinating process in step 3 can be performed in air or an inert gas atmosphere at 50~350° C., preferably at 60~330° C., and more preferably at 65~300° C., but not always limited thereto.

Further, the present invention provides an apparatus for the decomposition of hydrogen peroxide comprising the solid-phase catalyst for decomposing hydrogen peroxide.

Hereinafter, the apparatus for the decomposition of hydrogen peroxide according to the present invention is described in more detail.

The apparatus for the decomposition of hydrogen peroxide of the present invention contains a hydrogen peroxide storage tank; a reactor connected to the hydrogen peroxide storage tank and filled with the solid-phase catalyst for decomposing hydrogen peroxide; and an oxygen storage unit connected to the reactor and storing oxygen generated by the hydrogen peroxide decomposition reaction in the reactor.

In the reactor of the apparatus for the decomposition of hydrogen peroxide of the present invention, the hydrogen peroxide introduced from the hydrogen peroxide storage tank is decomposed by the solid-phase catalyst for decomposing hydrogen peroxide charged in the reactor.

At this time, the solid-phase catalyst for decomposing hydrogen peroxide can be recovered from water generated in the reactor after completion of the hydrogen peroxide decomposition reaction, and oxygen generated in the reaction can be stored in the oxygen storage unit.

In addition, the present invention provides a method for the decomposition of hydrogen peroxide comprising the following steps:

immersing the solid-phase catalyst for decomposing hydrogen peroxide in hydrogen peroxide to induce the decomposition of hydrogen peroxide into water and oxygen (step a); and recovering the solid-phase catalyst for decomposing hydrogen peroxide remaining after the catalytic reaction in step a (step b).

Hereinafter, the method for the decomposition of hydrogen peroxide according to the present invention is described in more detail.

First, in the method for the decomposition of hydrogen peroxide of the present invention, step a is to decompose hydrogen peroxide into water and oxygen by immersing the solid-phase catalyst for decomposing hydrogen peroxide in hydrogen peroxide.

In step a, in order to decompose hydrogen peroxide into water and oxygen as shown in reaction formula 1 below, the said solid-phase catalyst is immersed in hydrogen peroxide.

$2H_2O_2 \rightarrow 2H_2O + O_2$            <Reaction Formula 1>

In step a, the concentration of hydrogen peroxide can be 5%~50%, and the decomposition can be performed at a low temperature range between 1° C.~50° C., but not always limited thereto.

Next, in the method for the decomposition of hydrogen peroxide of the present invention, step b is to recover the used solid-phase catalyst for decomposing hydrogen peroxide remaining after the catalytic reaction of step a.

In step b, the solid-phase catalyst for decomposing hydrogen peroxide remaining in water after the catalytic reaction can be recovered and reused.

When the recovered solid-phase catalyst for decomposing hydrogen peroxide is reused, the catalyst still displays 70% to 90% of its original capacity.

Practical and presently preferred embodiments of the present invention are illustrative as shown in the following Examples and Experimental Examples.

However, it will be appreciated that those skilled in the art, on consideration of this disclosure, may make modifications and improvements within the spirit and scope of the present invention.

EXAMPLE 1

Preparation of a Solid-Phase Catalyst for Decomposing Hydrogen Peroxide Treated with Acetic Acid Step 1: 10 ml of 1 M potassium permanganate and 30 ml of 1 M manganese (II) acetate were dissolved in 20 ml of distilled water, to which 99% acetic acid was additionally added. Then the mixture was stirred at room temperature for 10 minutes.

Step 2: The mixture prepared in step 1 was tightly sealed, followed by aging in a dark room at room temperature under normal pressure for 72 hours.

Step 3: The solid-phase catalyst produced in the mixture of step 2 was recovered, which was then washed with 90 ml of ethanol and then dried in a 70° C. vacuum oven. Then, calcination was performed at 200° C., resulting in the preparation of a solid-phase catalyst for decomposing hydrogen peroxide.

EXAMPLE 2

Preparation of a Solid-Phase Catalyst for Decomposing Hydrogen Peroxide Treated with Formic Acid A solid-phase catalyst for decomposing hydrogen peroxide was prepared by the same manner as described in Example 1, except that 15 ml of 96% formic acid was used instead of acetic acid as an organic acid in step 1 of Example 1.

EXAMPLE 3

Preparation of a Solid-Phase Catalyst for Decomposing Hydrogen Peroxide Treated with Oxalic Acid A solid-phase catalyst for decomposing hydrogen peroxide was prepared by the same manner as described in Example 1, except that 8 ml of 3 M oxalic acid was used instead of acetic acid as an organic acid in step 1 of Example 1.

EXAMPLE 4

Preparation of a Solid-Phase Catalyst for Decomposing Hydrogen Peroxide Treated with Citric Acid A solid-phase catalyst for decomposing hydrogen peroxide was prepared by the same manner as described in Example 1, except that 8 ml of 12 M citric acid was used instead of acetic acid as an organic acid in step 1 of Example 1.

COMPARATIVE EXAMPLE 1

Homogeneous Catalyst

Potassium permanganate (KMnO$_4$) manufactured by Junsei Co. (CAS No.: 7722-64-7, Lot No.: 2015C1513, Assay: min. 99.3%) was prepared.

COMPARATIVE EXAMPLE 2

Homogeneous Catalyst

Manganese dioxide (MnO$_2$) manufactured by Sigma-Aldrich Co. (CAS No.: 1313-13-9, 025-001-00-3 Lot No.: MKBS8414V, Assay: min. 99.99% (trace metal basis)) was prepared.

COMPARATIVE EXAMPLE 3

Preparation of a Solid-Phase Catalyst For Decomposing Hydrogen Peroxide Treated with Propionic Acid A solid-phase catalyst for decomposing hydrogen peroxide was prepared by the same manner as described in Example 1, except that 30 ml of 99% propionic acid was used instead of acetic acid as an organic acid in step 1 of Example 1.

COMPARATIVE EXAMPLE 4

Preparation of a Solid-Phase Catalyst For Decomposing Hydrogen Peroxide Treated with Butyric Acid A solid-phase catalyst for decomposing hydrogen peroxide was prepared by the same manner as described in Example 1, except that 40 ml of 99% butyric acid was used instead of acetic acid as an organic acid in step 1 of Example 1.

EXPERIMENTAL EXAMPLE 1

Comparative Analysis of Crystallization

To investigate the crystallization according to the type of the organic acid treated to the solid-phase catalyst for decomposing hydrogen peroxide, the solid-phase catalysts prepared in Examples 1~4, Comparative Example 3, and Comparative Example 4 were observed by the naked eye and the results are shown in Table 1 below.

TABLE 1

| | Organic acids used in the catalyst | Crystallization |
|---|---|---|
| Example 1 | Acetic acid | ○ |
| Example 2 | Formic acid | ○ |
| Comparative Example 3 | Propionic acid | X |
| Comparative Example 4 | Butyric acid | X |
| Example 3 | Oxalic acid | ○ |
| Example 4 | Citric acid | ○ |

As shown in Table 1, when propionic acid (Comparative Example 3) and butyric acid (Comparative Example 4) were used, a solid precipitate catalyst was not produced, while acetic acid, formic acid, oxalic acid and citric acid were used (Examples 1~4), a solid precipitate catalyst was generated.

EXPERIMENTAL EXAMPLE 2

Comparative Analysis of Oxygen Generation Rate

To investigate the oxygen generation rate in the course of the decomposition of hydrogen peroxide by the solid-phase catalyst for decomposing hydrogen peroxide of the present invention, the catalysts of Example 1, Comparative Example 1 and Comparative Example 2 were immersed in 20 ml of 10% hydrogen peroxide at 2° C., followed by observation. The results are shown in Table 2 and FIG. 1.

TABLE 2

| | Oxygen generation rate (L/min · g) |
|---|---|
| Example 1 | 15.4 |
| Comparative Example 1 | 40.8 |
| Comparative Example 2 | 0.7 |

As shown in Table 2 and FIG. 1, the catalyst of Comparative Example 1, which is a potassium permanganate catalyst uniformly present in hydrogen peroxide, exhibited the highest oxygen generation rate of 40.8 L/min·g, while the catalyst of Example 1 present in the form of solid distributed heterogeneously in hydrogen peroxide demonstrated the oxygen generation rate of 15.4 L/min·g. The catalyst of Comparative Example 2 present in the form of solid distributed heterogeneously in hydrogen peroxide demonstrated the oxygen generation rate of 0.7 L/min·g. Therefore, the solid-phase catalyst of Example 1 was confirmed to exhibit the most excellent oxygen generation rate.

When the catalyst of Example 1 recovered after the decomposition of hydrogen peroxide was used, the oxygen generation rate was 12 L/min·g, which was approximately 80% of the original catalyst capacity.

EXPERIMENTAL EXAMPLE 3

Analysis of Residual Solution after Decomposition of Hydrogen Peroxide

To investigate the reactivity and pH of the residual solution remaining after the decomposition of hydrogen peroxide by using the solid-phase catalyst for decomposing hydrogen peroxide of the present invention, hydrogen peroxide was decomposed using the catalysts of Example 1, Comparative Example 1 and Comparative Example 2 and then pH of the residual solution was measured. Then, the residual solution was reacted with hydrogen peroxide. The results are shown in FIG. 2 and Table 3.

TABLE 3

|  | pH (supernatant) | Reactivity to hydrogen peroxide (supernatant) |
|---|---|---|
| Example 1 | 7 | X |
| Comparative Example 1 | 9 | ○ |
| Comparative Example 2 | 7 | X |

Figure 2:
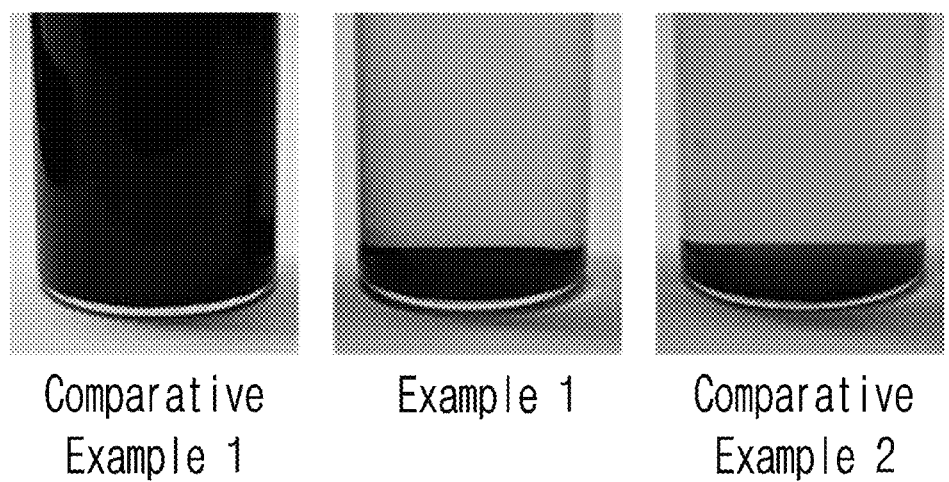
FIG. 2 is a set of photographs illustrating the comparison of the remaining catalyst and filtrate after the decomposition of hydrogen peroxide by the catalysts of Example 1, Comparative Example 1 and Comparative Example 2 according to the present invention.

As shown in Table 3 and FIG. 2, the catalyst of Comparative Example 1, which is a potassium permanganate catalyst uniformly present in hydrogen peroxide, showed basicity of pH 9 due to KOH generated by the hydrogen peroxide decomposition reaction. In the meantime, the catalyst of Example 1 present in the form of solid distributed heterogeneously in hydrogen peroxide showed pH 7 which is the same pH as pH of distilled water. Also, the catalyst of Comparative Example 2 present in the form of solid distributed heterogeneously in hydrogen peroxide showed pH 7.

When hydrogen peroxide was additionally added to the residual solution containing the catalyst of Comparative Example 1, reaction was induced and the remaining catalyst component was confirmed. When hydrogen peroxide was additionally added to the residual solution containing the catalyst of Example 1 or Comparative Example 2 in which layer separation occurred, no additional reaction was induced.

The hydrogen peroxide decomposition performance of the solid-phase catalyst for decomposing hydrogen peroxide of the present invention and the residual form after the hydrogen peroxide decomposition reaction were confirmed. Compared with the conventional solid-phase catalyst manganese dioxide, the hydrogen peroxide decomposition rate of the catalyst of the invention was significantly higher. In addition, the catalyst of the invention has an advantage of easy recovery after the decomposition reaction since it can stay as a solid phase.

INDUSTRIAL APPLICABILITY

The present invention provides a solid-phase catalyst for decomposing hydrogen peroxide comprising a permanganate salt and a manganese (II) salt. The solid-phase catalyst stays a solid state in the form of nanoparticles at the time of hydrogen peroxide decomposition, and thus can be recovered for reuse and also has an excellent decomposition rate. In the method for producing a solid-phase catalyst for decomposing hydrogen peroxide according to the present invention, a solid-phase catalyst is produced from a solution containing a permanganate salt, a manganese (II) salt, and an organic acid, so that the produced solid-phase catalyst is precipitated as a solid component even after a catalytic reaction, and thus is reusable and environmentally friendly, and cost reduction can be achieved through the simplification of a catalyst production technique.

What is claimed is:

1. A method for producing a solid-phase catalyst for decomposing hydrogen peroxide comprising the following steps:
    preparing an aqueous solution, comprising adding a permanganate salt, a manganese (II) salt and one or more organic acids selected from the group consisting of formic acid, acetic acid, oxalic acid, and citric acid to water (step 1);
    aging the aqueous solution of step 1 to form a solid-phase catalyst (step 2); and
    cleaning, drying and calcinating the solid-phase catalyst formed in step 2 (step 3).

2. The method for producing a solid-phase catalyst for decomposing hydrogen peroxide according to claim 1, wherein the solid-phase catalyst is a heterogeneous catalyst of nanoparticles.

3. The method for producing a solid-phase catalyst for decomposing hydrogen peroxide according to claim 1, wherein the permanganate salt is selected from the group consisting of potassium permanganate ($KMnO_4$), zinc permanganate ($Zn(MnO_4)_2$), calcium permanganate ($Ca(MnO_4)_2$), silver permanganate ($AgMnO_4$), sodium permanganate ($NaMnO_4$), barium permanganate ($Ba(MnO_4)_2$), magnesium permanganate ($Mg(MnO_4)_2$), strontium permanganate ($Sr(MnO_4)_2$), lithium permanganate ($LiMnO_4$), cadmium permanganate ($Cd(MnO_4)_2$), cesium permanganate ($CsMnO_4$), and rubidium permanganate ($RbMnO_4$).

4. The method for producing a solid-phase catalyst for decomposing hydrogen peroxide according to claim 1, wherein the manganese (II) salt is one or more compounds selected from the group consisting of manganese acetate, manganese nitrate, manganese chloride, manganese acetylacetonate, manganese bromide, manganese carbonate, manganese fluoride, manganese iodide, and manganese sulfate.

5. The method for producing a solid-phase catalyst for decomposing hydrogen peroxide according to claim 1, wherein the aging treatment in step 2 is performed with the sealed mixture in a dark room at room temperature at normal pressure for 5~80 hours.

6. The method for producing a solid-phase catalyst for decomposing hydrogen peroxide according to claim 1, wherein the calcinating process in step 3 is performed in air or an inert gas atmosphere at 50~350° C.

* * * * *